(12) United States Patent
Glejbol et al.

(10) Patent No.: US 10,962,148 B2
(45) Date of Patent: Mar. 30, 2021

(54) METHOD OF TESTING AN UNBONDED FLEXIBLE PIPE

(71) Applicant: National Oilwell Varco Denmark I/S, Brondby (DK)

(72) Inventors: Kristian Glejbol, Glostrup (DK); Michael Eilersen, Hvidovre (DK); Anders Straarup, Valby (DK); Christian Ditlev Cappeln, Soborg (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 346 days.

(21) Appl. No.: 15/751,246

(22) PCT Filed: Aug. 5, 2016

(86) PCT No.: PCT/DK2016/050260
§ 371 (c)(1),
(2) Date: Feb. 8, 2018

(87) PCT Pub. No.: WO2017/025094

PCT Pub. Date: Feb. 16, 2017

(65) Prior Publication Data

US 2018/0231149 A1    Aug. 16, 2018

(30) Foreign Application Priority Data

Aug. 10, 2015 (DK) .......................... PA 2015 70511

(51) Int. Cl.
*F16L 11/08* (2006.01)
*F16L 11/127* (2006.01)
(Continued)

(52) U.S. Cl.
CPC ........... *F16L 11/082* (2013.01); *F16L 11/127* (2013.01); *F16L 53/37* (2018.01); *G01K 1/14* (2013.01);
(Continued)

(58) Field of Classification Search
CPC ........ F16L 11/082; F16L 53/37; F16L 11/127; G01M 3/002; G01M 5/0025; G01M 3/38; G01K 11/32; G01K 1/14
See application file for complete search history.

(56) References Cited

U.S. PATENT DOCUMENTS

2004/0168521 A1   9/2004 Anderson
2012/0217000 A1*  8/2012 Bremnes .............. H05B 3/0004
                                                    166/57

(Continued)

FOREIGN PATENT DOCUMENTS

DE   10 2008 056 089 A1   7/2010
WO       2008/077410 A1   7/2008

(Continued)

OTHER PUBLICATIONS

"Specification for Unbonded Flexible Pipe" API Recommended Practice 17B, Third edition, Mar. 2002 (Year: 2002).*

(Continued)

*Primary Examiner* — Brandi N Hopkins
*Assistant Examiner* — Janice M Soto
(74) *Attorney, Agent, or Firm* — Pearne & Gordon LLP (57) ABSTRACT

The present invention relates to a method of testing an unbonded flexible pipe. The unbonded flexible pipe has a length and a longitudinal axis and comprises, from the inside and out, an internal armour layer, an internal pressure sheath, at least one external amour layer and an outer sheath. At least one of the layers comprises an optical sensor connected to an optical monitoring system and at least one of the armour (Continued)

layers is a metallic and electrically conductive amour layer. The method makes it possible to test an electrical heating system and an optical sensor substantially simultaneously.

23 Claims, 4 Drawing Sheets

(51) Int. Cl.

| | |
|---|---|
| *G01K 1/14* | (2021.01) |
| *G01K 11/32* | (2021.01) |
| *F16L 53/37* | (2018.01) |
| *G01M 3/38* | (2006.01) |
| *G01M 5/00* | (2006.01) |
| *G01M 3/00* | (2006.01) |

(52) U.S. Cl.
CPC ............ *G01K 11/32* (2013.01); *G01M 3/002* (2013.01); *G01M 3/38* (2013.01); *G01M 5/0025* (2013.01)

(56) References Cited

U.S. PATENT DOCUMENTS

2014/0290343 A1* 10/2014 Kulkarni ............... G01M 3/002
73/40.5 R

2016/0266001 A1* 9/2016 McNab .................. G01M 3/18

FOREIGN PATENT DOCUMENTS

| WO | WO-2008077410 A1 * | 7/2008 | .......... G01M 11/086 |
|---|---|---|---|
| WO | 2011/042023 A1 | 4/2011 | |
| WO | 2012/092931 A1 | 7/2012 | |
| WO | WO-2012092931 A1 * | 7/2012 | ............ F16L 11/083 |
| WO | 2013/135244 A1 | 9/2013 | |
| WO | 2014/081668 A1 | 5/2014 | |
| WO | 2015/014365 A1 | 2/2015 | |
| WO | 2015/063457 A1 | 5/2015 | |

OTHER PUBLICATIONS

Danish Search Report for Application No. PA 2015 70511, dated Mar. 11, 2016.
International Search Report for International Application No. PCT/DK2016/050260, dated Sep. 30, 2016.
"Recommended Practice for Flexible Pipe", ANSI/API Recommended PRACTICE17 B, Fourth edition, Jul. 2008.
"Specification for Unbonded Flexible Pipe", ANSI/API Specification 17J, Third edition, Jul. 2008.
Extended European Search Report for 16 83 4693 dated Mar. 6, 2019.

* cited by examiner

METHOD OF TESTING AN UNBONDED FLEXIBLE PIPE

The present invention relates to a method of testing an unbonded flexible pipe having a length and a longitudinal axis and comprising, from the inside and out, an internal armour layer, an internal pressure sheath, at least one external amour layer and an outer sheath, comprising a thermal sensor connected to a monitoring system, and at least one of the armour layers is a metallic and electrically conductive amour layer.

TECHNICAL FIELD

Flexible unbonded pipes are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. Such pipes comprise an innermost sealing sheath—often referred to as an internal pressure sheath, which forms a barrier against the outflow of the fluid which is conveyed in the bore of the pipe, and one or usually a plurality of armouring layers. Often the pipe further comprises an outer protection layer which provides mechanical protection of the armour layers. The outer protection layer may be a sealing layer sealing against ingress of sea water, and is often referred to as the outer sheath. In general flexible pipes are expected to have a lifetime of 20 years or more in operation.

Before unbonded flexible pipes are released from the manufacturer and delivered to the purchaser they are tested according to "Specification for Unbonded Flexible Pipe", ANSI/API 17J, Third edition, July 2008, part 10. The tests are denoted factory acceptance tests (FAT) and include a gauge test and hydrostatic pressure test and optionally an electrical continuity and resistance test, in case the pipe comprises cathodic protection. Moreover, the test may include a gas-venting and resistance test if the unbonded flexible pipes have gas relief valves or ports installed in the end fittings.

Recent development in unbonded flexible pipes push these systems towards unbonded flexible pipes comprising heating and sensor systems. In particular, a newly developed pipe enables electrical heating of the pipe, and at the same time optical monitoring of the temperature in the pipe. It is desirable to test the heating system as well as the temperature monitoring system before the unbonded flexible pipes are released from the manufacturer.

DISCLOSURE OF INVENTION

An object of the present invention is to provide an improved method of testing an unbonded flexible pipe.

Consequently, the present invention relates to a method of testing an unbonded flexible pipe having a length and a longitudinal axis and comprising, from the inside and out, an internal armour layer, an internal pressure sheath, at least one external amour layer and an outer sheath, at least one of the layers comprises a thermal sensor connected to a monitoring system, and at least one of the armour layers is metallic and electrically conductive. The method comprises:
  connecting the metallic amour layer to an electric power source
  sending an electric current through the metallic armour layer
  measuring the shift in temperature in the flexible pipe by using the thermal sensor and processing the results to obtain a temperature profile for the pipe; and
  comparing the obtained temperature profile with a reference temperature profile and determining if the flexible pipe meets the required specifications.

The method of testing according to the invention may be performed before the unbonded flexible pipe is released from the manufacturer. However, the method of testing may also be performed on the unbonded flexible pipe when in use.

In general unbonded flexible pipes are expected to have a lifetime of about 20 years in operation, and the method of testing may be applied at any time during the operation time. Thus, the method may be used to validate the function of the heating system in the unbonded flexible pipe.

The "required specifications" are the specifications which the unbonded flexible pipe are expected to meet and the defined parameter ranges within which the unbonded flexible pipe should perform. The specifications may be determined by the manufacturer and/or the purchaser. According to the method of testing the invention, it is particularly the specifications for the metallic armour layer for heating and the optical sensor which are of interest. The measurements by the optical sensor should preferably provide a temperature profile which is in line with the reference temperature profile. Otherwise the unbonded flexible pipe may not meet the required specifications and may need to be discarded or optionally repaired.

The term "measure" in measured/measuring a parameter e.g. temperature includes both a direct measurement as well as a measurement of related parameters by which the parameter in question can be calculated. The terms 'measure' and 'determine' are used interchangeably.

The term "unbonded" means in this context that at least two of the layers including the armour layers and polymer layers are not bonded to each other. In practice the known pipe normally comprises at least two armour layers located outside the internal pressure sheath and optionally an armour structure located inside the internal pressure sheath normally referred to as a carcass.

The unbonded flexible pipe comprises a longitudinal axis which also defines a centre axis of the pipe, and is sometimes simply is referred to as the axis.

The unbonded flexible pipe comprises an armour layer on the inside of the internal pressure sheath, i.e. the pipe comprises a carcass. The carcass is made from metallic and electrically conductive material.

The unbonded flexible pipe also comprises at least one external armour layer on the outside of the internal pressure sheath. The term "external armour layer" denotes an armour layer placed on the outer side of the internal pressure sheath. The external armour layer may e.g. be a pressure armour or a tensile armour. Moreover, the term "layer" should be construed broadly, and also the internal pressure sheath and the outer sheath constitute layers in the unbonded flexible pipe. In an embodiment, the unbonded flexible pipe also comprises one or more layers of insulating material. The insulating material may provide both thermal and/or electrical insulation.

The terms "inside" and "outside" a layer, such as a layer formed by e.g. the internal pressure sheath, of the pipe is used to designate the relative distance to the axis of the pipe, such that "inside a layer" means the area encircled by the layer i.e. with a shorter axial distance than the layer, and "outside a layer" means the area not encircled by the layer and not contained by the layer, i.e. with a longer distance to the axis of the pipe than the layer.

The term "inner side" of a layer is the side of the layer facing the axis of the pipe. The term "outer side" of a layer is the side of the layer facing away from the axis of the pipe.

The term "substantially" should herein be taken to mean that ordinary product variances and tolerances are comprised.

Flexible pipes having metallic electrically conductive armour layers used for heating are e.g. disclosed in e.g. WO 2015/014365 A1. In principle, the system is quite simple, the electric current sent through the metallic and electrically conductive layers, will, due to the electrical resistance in the metallic material, result in Joule heating of the pipe.

In an embodiment, the thermal sensor is based on the measurement of optical properties of a glass fibre, thus, the thermal sensor is an optical sensor, which is able to provide very precise measurements.

Optical sensors in the unbonded flexible pipe have also become common in recent years. Unbonded flexible pipes having optical sensors are e.g. disclosed in WO 2013/135244 A1.

In an embodiment, the unbonded flexible pipe comprises no external electrically conductive armour layers, thus, the electric current sent forward through the carcass is returned to the electric power source via a power cable.

In an embodiment, the unbonded flexible pipe comprises at least one of the external armour layers which is a metallic and electrically conductive armour layer, and the electric current is returned to the electric power source via this layer in the flexible pipe. Thus, the electric current may be sent through the carcass from the power source and returned to the power source via the external armour layer, which may e.g. be a pressure armour layer or a tensile armour layer, thus forming the return path for the current.

During the test, the electric current increases the temperature in the metallic armour layers due to Joule heating. The change in the temperature is measured by the thermal sensor(s). Thus, irregularities in the electrical conductivity along the pipe will be detected by the thermal sensors as an uneven rise in temperature.

The length of the unbonded flexible pipes to be tested in accordance with the method may vary within a rather broad range. The length may vary from about 50 m up to about 5000 m, such as from about 100 m up to about 2500 m, or from about 200 m up to 2000 m.

In an embodiment of the method according to the invention, output from the optical sensor to the optical monitoring system is compared to a reference temperature profile obtained from a reference pipe under well-defined operational conditions. The comparison makes it possible to determine if the function of the optical sensor is satisfactory, and if the metallic armour layers are substantially free of errors. The well-defined operational conditions are preferably established in the factory where the pipe is manufactured and relate to surrounding temperature, humidity and measured length. Moreover, the well-defined conditions may also relate to the voltage applied over the pipe and the current sent through the pipe. Preferably the flexible pipe to be tested should be tested under the same conditions as the reference pipe.

Consequently, the method according to the invention is capable of testing an electric heating system and optical sensor in an unbonded flexible pipe substantially simultaneously.

In an embodiment the reference temperature profile is established by calculating the thermal properties of the unbonded flexible pipe. This can be done from known physical parameters of the materials forming the pipe, as a matter of routine using well-known mathematical formulas and computer.

It may be advantageous to heat the armour layer closest to the fluid to be transported, and in an embodiment the current is sent through the metallic armour layer on the inside of the pressure sheath. When the current is sent through the inner armour layer or carcass on the inside of the pressure sheath, the current will cause a rise in the temperature of the carcass, which is closest to the transported fluid.

In an embodiment, all or some of the external armour layers are metallic and electrically conductive layers, i.e the pressure armour layers, the tensile armour layers are metallic and electrically conductive armour layers. Thus, the pressure armour layers may be constituted by two metallic layers, or one metallic layer and one layer of e.g. polymer material. Also the tensile armour layers may be constituted by two metallic layers, or one metallic layer and one layer of e.g. polymer material.

In an embodiment of the unbonded flexible pipe the external armour layer is constituted by a pressure armour layer, which may be made from electrically conductive material or from polymer material.

In an embodiment the external armour layer is constituted by a tensile armour layer, which may be made from metallic and electrically conductive material or from polymer material.

As mentioned, the electric current from the electric power source may pass through the carcass, and in an embodiment the current's return path to the electric power source is the pressure armour layer, the tensile armour layer or a combination of both.

In an embodiment, the flexible pipe comprises electrically insulating layers between the armour layers. This embodiment is particularly suitable when neighboring armour layers are metallic electrically conductive layers.

For the purpose of testing the system, and also to avoid any risk of overheating, the electric current may be sent through the metallic armour layer in pulses. Consequently, in an embodiment of the method, the electric power is alternately sent through the metallic armour layer and switched off. The embodiment provides the opportunity to test both the armour layer and the optical sensor, while at the same time minimizing the risk of over-heating the pipe.

In an embodiment the electric current is sent through the metallic armour layer during a first period, followed by a second period during which the electric power is switched off.

In an embodiment the first period is in the range of about 10 minutes to about 10 hours.

In an embodiment the second period is in the range of about 10 minutes to about 10 hours.

According to an embodiment of the method, the annulus between the internal pressure sheath and the outer sheath is filled with an inert gas such as nitrogen. The inert gas will replace oxygen and flammable gasses which may cause explosions if a spark is released from the electrically conductive armour layers.

In an embodiment the annulus between the internal pressure sheath and the outer sheath is filled with a liquid. The liquid may serve the same purpose as the inert gas.

In an embodiment the liquid is a corrosion inhibiting liquid. Such a liquid may reduce the corrosion of the metallic armour layers. The liquid may be based on oil.

In an embodiment the metallic armour layers comprises one or more optical sensors. As such the unbonded flexible pipe should comprise at least one optical sensor, and this sensor may be placed in a metallic armour layer. However, each armour layer may comprise an optical sensor or several optical sensors whereby improved measurements may be achieved for processing in the optical monitoring system. It is also possible to provide embodiments in which the optical sensor is located in or adjacent to the inner pressure sheath and/or the outer sheath. The optical sensor may also be located in or adjacent to an insulating layer.

In an embodiment the optical sensor(s) is (are) housed in a housing. The housing may be a tape, and the sensor may be enclosed between two strips of tape. The housing may also be a polymer material in which the sensor is embedded. The housing serves to protect the optical sensor against damage which may accidentally occur due to movements in the unbonded flexible pipe.

The invention also relates to a system for testing an unbonded flexible pipe having a length and a longitudinal axis and comprising, from the inside and out, an internal armour layer, an internal pressure sheath, at least one external armour layer and an outer sheath, at least one of the layers comprises a thermal sensor connected to a monitoring system and at least one of the armour layers is a metallic and electrically conductive amour layer, said system comprises the unbonded flexible pipe, an electric power source and the thermal sensor mounted in the unbonded flexible pipe and connected with the monitoring system, wherein the metallic armour layer is adapted for connection with the power source for heating the armour layer and the monitoring system is adapted for processing measurements from the thermal sensor to obtain a temperature profile for the pipe and compare the obtained temperature profile to a reference temperature profile.

According to the system the thermal sensor measures the temperature, and in an embodiment the thermal sensor is an optical sensor. Optical sensors are known to provide very good and reliable thermal measurements. Furthermore, optical sensors can be made from non-conductive materials, which make their deployment simpler in this context.

In an embodiment of the unbonded flexible pipe, the armour layer inside the internal pressure sheath is a carcass and made from a metallic and electrically conductive material. Thus, the unbonded flexible pipe has a carcass and a rough bore.

It may be an advantage to have the electric heating as close to the bore as possible, and in an embodiment the armour layer inside the internal pressure sheath is connected with the electric power source. In this manner the armour layer inside the internal pressure sheath, also referred to as the carcass, may be heated by the electric power. The carcass is inside the bore and during operation of the pipe in physical contact with the fluid in the bore. The bore is defined by the inner periphery of the internal pressure sheath.

The system provides an opportunity of testing the function of the heating of the armour layer and the optical sensor simultaneously, and in an embodiment the condition of the metallic armour layers and the functionality of the optical sensor are determined on the basis of the output from the optical sensor. The output from the optical sensor is compared to calculated values or values obtained under well-defined conditions, and by performing this comparison it is possible to determine the condition of the metallic armour layers and the functionality of the optical sensor.

According to the system there is provided an embodiment in which the metallic armour layer is cyclically heated and cooled during operation. The cycles may be between 1 minute and up to several hours. The cyclic heating and cooling may serve to hinder formation of hot spots which may damage the internal pressure sheath of the pipe.

The cyclic heating may also be provided as pulse width modulation (PWM). Thus, the electric power source provides electric power in pulses to the metallic armour layer.

In an embodiment the pulses have a length in the range from about $10^6$ Hz to about 10 Hz (PWM mode) or from about 10 Hz to about $10^{-3}$ Hz (switch mode).

In an embodiment the electric power input is provided as AC current.

In an embodiment the electric power input is provided as DC current.

When the electric power input is provided as AC current several means, besides the processing unit and control device, may be used to control the electric power input to the electric heating system, and in an embodiment the means for controlling the electric power input to the heating system comprise a transformer with variable turns ratio or a diode. As such the control device may operate the transformer or diode.

In an embodiment means for controlling the electric power input to the heating system comprise a thyristor switch operated either in PWM mode, switch mode or a combination hereof. This is useable for both AC and DC current.

DETAILED DESCRIPTION OF THE INVENTION

The invention will be explained in more details below in connection with a preferred embodiment and with reference to the drawings in which.

The drawings are schematic and only intended to illustrate the principles of the invention.

Figure 1:
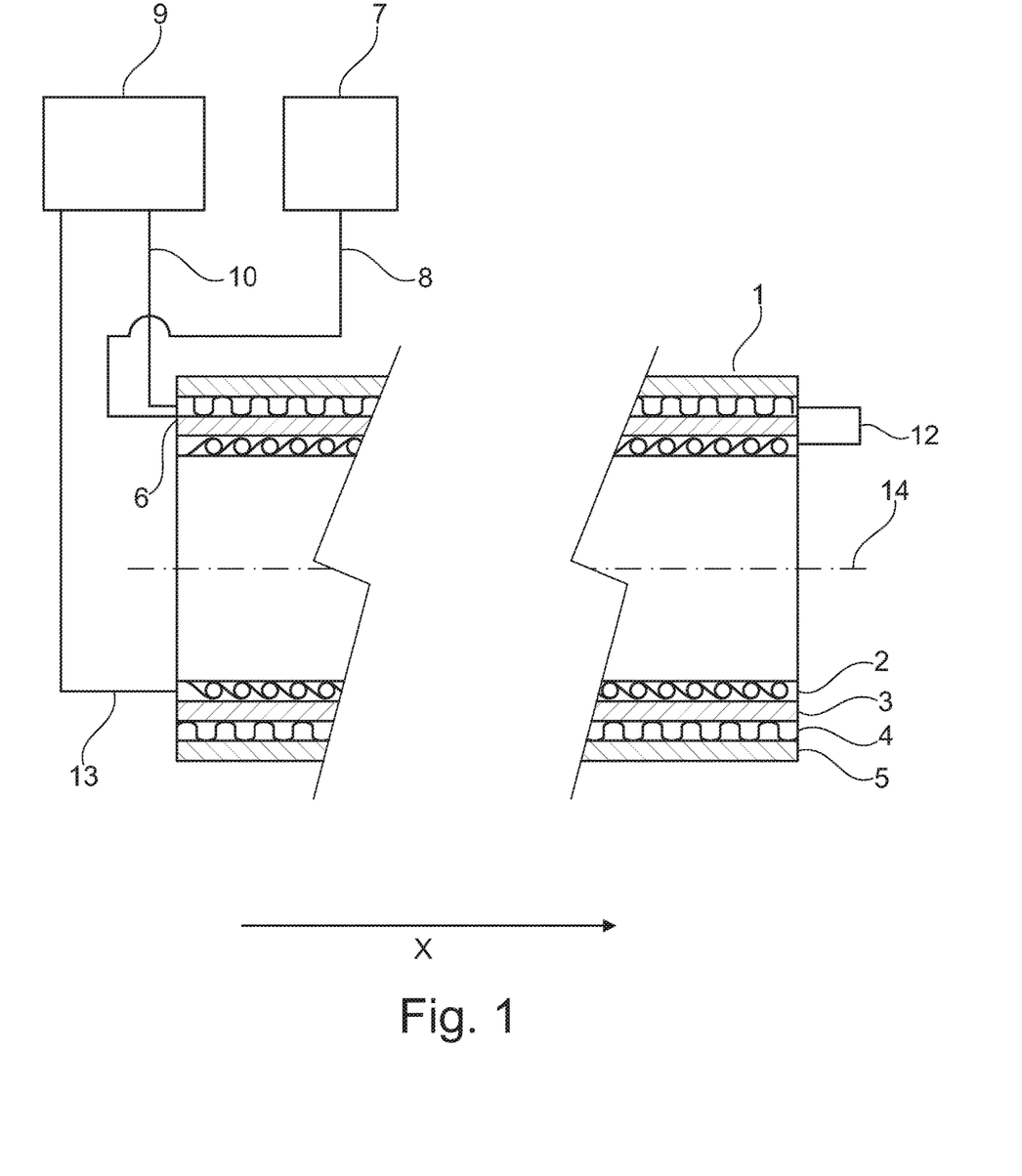
FIG. 1 illustrates the set-up for testing an unbonded flexible pipe according to the invention.

An unbonded flexible pipe is tested in accordance with the method according to the present invention. FIG. 1 shows a simplified sketch of the unbonded flexible pipe 1. The pipe 1 comprises, from the inside and out, a carcass 2 (inner armour layer), an inner pressure sheath 3 and a tensile armour 4 (external armour layer) and an outer sheath 5. An optical sensor 6 for measuring the temperature which in this particular example is included in the tensile armour 4 and connected to an optical monitoring system 7 via the wire 8. At one end of the unbonded flexible pipe the carcass 2 is connected to an electric power source 9 via wire 13. In the opposite end the carcass 2 is connected to the tensile armour 4 via connection 12. The tensile armour 4 is connected to the electric power source 9 via the wire 10. The dotted line 14 indicates the longitudinal axis of the pipe.

Figure 2:
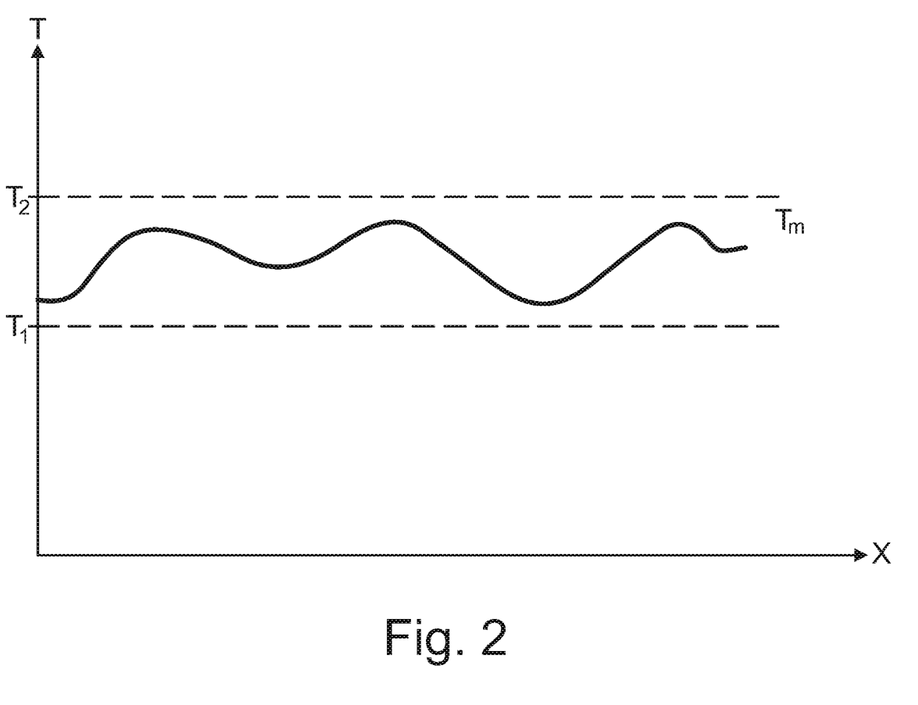
FIG. 2 shows a temperature profile along the length of an unbonded flexible pipe.

The carcass 2 is made from stainless steel, whereas the tensile armor layer is made from carbon steel. Thus, an electrical circuit is formed by the electric power source 9, the carcass 2 and the tensile armour 4. When a current is sent through the electrical circuit heat will be generated in the armour layers 2 and 4 due to the electrical resistance in the material. In particular heat will be generated in the carcass 2 due to the fact that the electrical resistance of the carcass is significantly higher than the electrical resistance of the tensile armour layer. FIG. 2 shows a temperature profile with temperature T along the length or longitudinal axis X of an unbonded pipe 1. The borderlines of the reference temperature profile are determined by the temperatures $T_1$ and $T_2$ and the measured temperature is within the ranges set by the reference temperature profile. This indicates that the properties of the unbonded flexible pipe 1 are within the specifications. $T_1$ is set to 85° C. and $T_2$ is set to 115° C., and thus the reference temperature profile defines a temperature range of 30° C.

Figure 3:
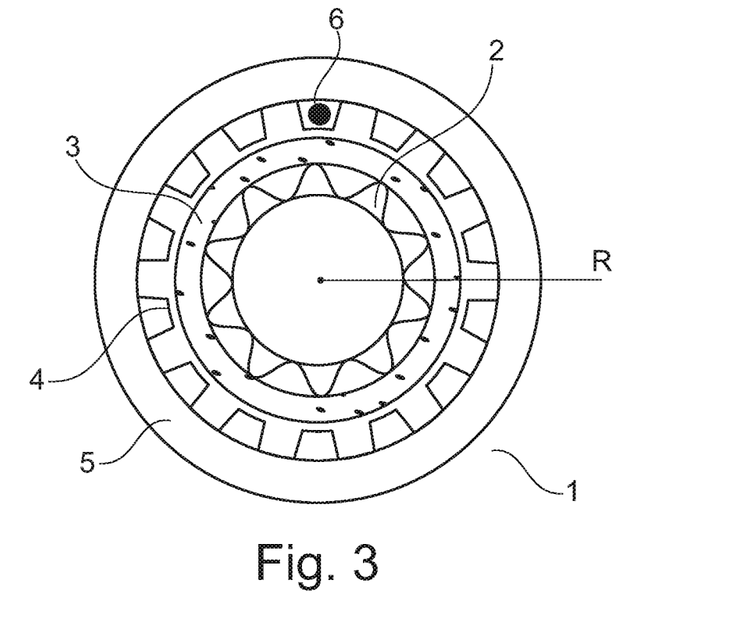
FIG. 3 shows a schematic depiction of a section of an unbonded flexible pipe.

The temperature is measured by the optical sensor and FIG. 3 illustrates how the sensor is located in the unbonded flexible pipe. FIG. 3 is a section through the unbonded flexible pipe 1, and in radial direction R from the inside and out are seen the carcass 2, the internal pressure sheath 3, the tensile armour 4 and the outer sheath 5. Located in the tensile armour 4 is the optical sensor 6.

Figure 4:
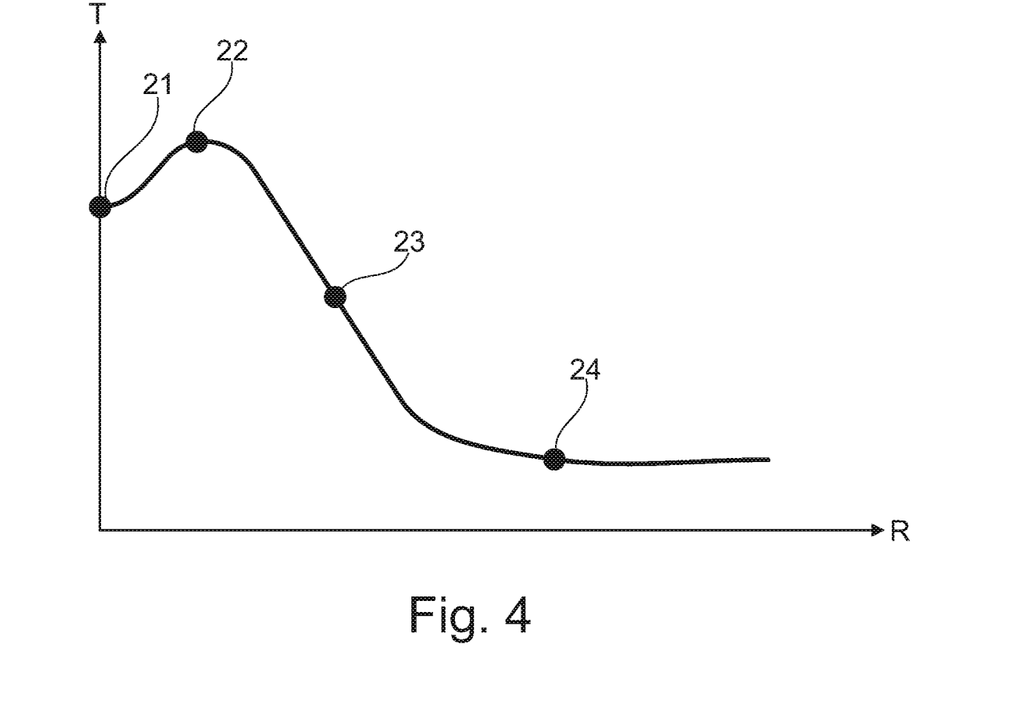
FIG. 4 shows a temperature profile in radial direction of an unbonded flexible pipe.

FIG. 4 illustrates how the temperature varies in radial direction R of the unbonded flexible pipe 1. Position 21 is at the center axis of the pipe, position 22 is in the carcass and position 23 is at the optical sensor in the tensile armour. As it can be seen, the temperature is at a maximum in the carcass and decreases in radial direction towards the outer sheath at position 24, where the temperature substantially corresponds to the temperature of the surrounding environment. At the position 23 of the optical sensor the temperature is lower than the temperature of the carcass at position 22. This relationship is encoded into the optical monitoring system, so the system will be able to provide the temperature at different positions in the unbonded flexible pipe.

Figure 5:
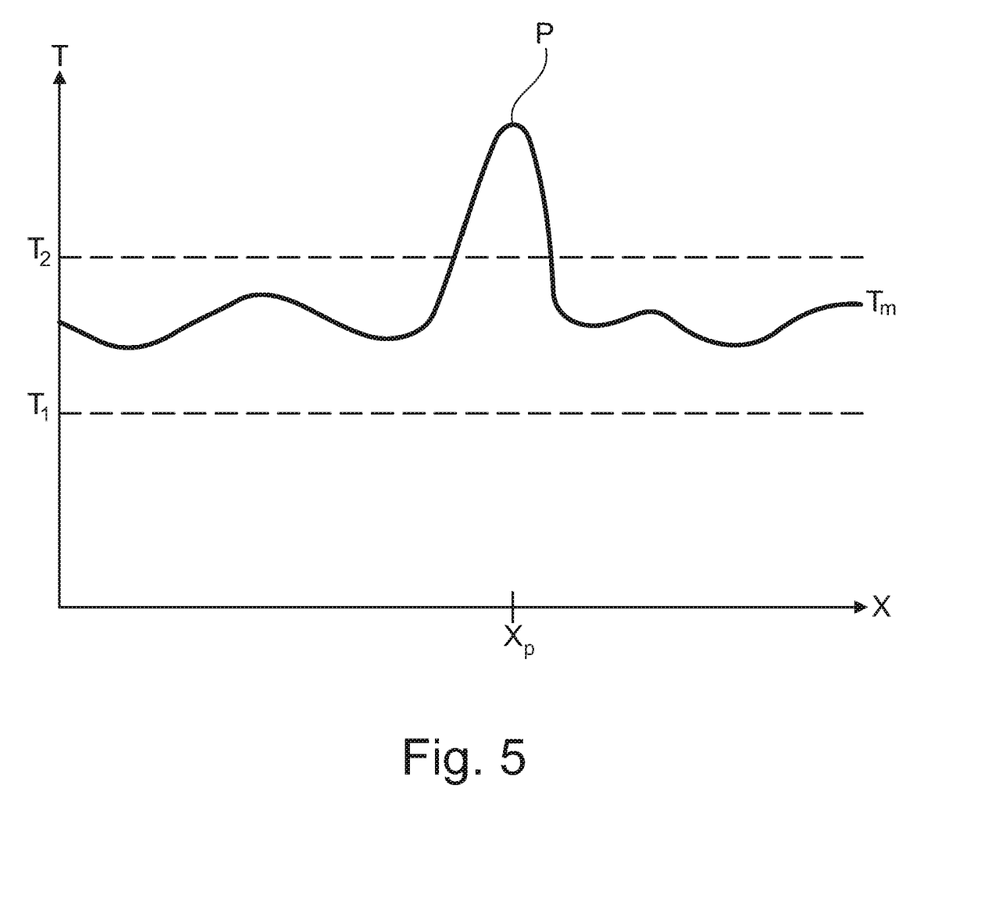
FIG. 5 shows a temperature profile along the length of an unbonded flexible pipe.

FIG. 5 corresponds to FIG. 2. However, in FIG. 5 a peak P appears at position $X_P$ where the temperature is above $T_2$ and outside the reference temperature profile. This indicates an error in the unbonded flexible pipe at position $X_P$. The error may be a hot spot in the carcass, which is highly undesirable as it may damage the internal pressure sheath.

As mentioned the drawings are only intended to illustrate the principles of the invention. In FIG. 1 the end-fittings in which the unbonded flexible pipe is normally terminated and the electrical connections to the carcass and the tensile armour are established have been excluded in the drawing for reasons of simplicity.

What is claimed is:

1. A method of testing an unbonded flexible pipe having a length and a longitudinal axis and comprising, from the inside and out, an internal armour layer, an internal pressure sheath, at least one external amour layer and an outer sheath, said pipe comprising at least one thermal sensor connected to a monitoring system and at least one of the armour layers is a metallic and electrically conductive armour layer, said method comprises:
   connecting the metallic armour layer to an electric power source;
   sending an electric current through the metallic armour layer;
   measuring the temperature in the flexible pipe by using the thermal sensor and processing the results in the monitoring system to obtain a temperature profile for the pipe; and
   comparing the obtained temperature data to a reference temperature profile and determining if the flexible pipe meets the required specifications,
wherein electric power is sent through the metallic armour layer during a first period, followed by a second period wherein the electric power is switched off.

2. The method according to claim 1 where the thermal sensor is based on the measurement of optical properties of a glass fibre.

3. The method according to claim 1, wherein the internal armour layer on the inside of the internal pressure sheath is a metallic and electrically conductive armour layer.

4. The method according to claim 1, wherein the current is sent through the internal armour layer on the inside of the pressure sheath.

5. The method according to claim 1, wherein the external armour layer is a metallic and electrically conductive armour layer and the electric current is returned to the electric power source via the external armour layer in the flexible pipe.

6. The method according to claim 1, wherein the output from the optical sensor is compared to a reference temperature profile obtained under well-defined operational conditions.

7. The method according to claim 1, wherein the reference temperature profile is established by calculating the thermal properties of the unbonded flexible pipe.

8. The method according to claim 1, wherein the unbonded flexible pipe comprises more external armour layers selected from pressure armour layers and tensile armour layers.

9. The method according to claim 1, wherein the current is returned to the power source via the pressure armour layer, the tensile armour layer, or a combination of both.

10. The method according to claim 1, wherein the annulus between the internal pressure sheath and the outer sheath is filled with an inert gas.

11. The method according to claim 1, wherein the annulus between the internal pressure sheath and the outer sheath is filled with a liquid.

12. The method according to claim 1, wherein the metallic armour layers comprises one or more optical sensors.

13. The method according to claim 1, wherein the optical sensor is housed in a housing.

14. The method according to claim 1, wherein the method further comprises:
   determining if the function of the thermal sensor and the condition of the metallic armour layers of the flexible pipe meet the required specifications by determining if the obtained temperature profile is within ranges set by the reference temperature profile.

15. A method of testing an unbonded flexible pipe having a length and a longitudinal axis and comprising, from the inside and out, an internal armour layer, an internal pressure sheath, at least one external amour layer and an outer sheath, said pipe comprising at least one thermal sensor connected to a monitoring system and at least one of the armour layers is a metallic and electrically conductive amour layer, said method comprises:
   connecting the metallic amour layer to an electric power source;
   sending an electric current through the metallic armour layer;
   measuring the temperature in the flexible pipe by using the thermal sensor and processing the results in the monitoring system to obtain a temperature profile for the pipe; and
   comparing the obtained temperature data to a reference temperature profile and determining if the flexible pipe meets the required specifications, wherein electric power is sent through the metallic armour layer during a first period, followed by a second period wherein the electric power is switched off, preferably the first period is in the range of about 10 minutes to about 10 hours preferably the second period is in the range of about 10 minutes to about 10 hours.

16. A system for testing an unbonded flexible pipe having a length and a longitudinal axis and comprising, from the inside and out, an internal armour layer, an internal pressure sheath, at least one external armour layer and an outer sheath and at least one temperature sensor connected to a monitoring system, and at least one of the armour layers is a metallic and electrically conductive armour layer, said system comprises:
the unbonded flexible pipe, and
an electric power source and the temperature sensor mounted in the unbonded
flexible pipe and connected to the monitoring system,
wherein the metallic armour layer is adapted for connection with the power source for heating the armour layer by sending an electric current through the metallic armour layer, and the monitoring system is adapted for processing measurements from the temperature sensor to obtain a temperature profile for the pipe, comparing the obtained temperature profile to a reference temperature profile obtained from a reference pipe under well-defined operational conditions in a factory where the pipe is manufactured and relating to surrounding temperature, humidity and measured length, and determining if the function of the thermal sensor and the condition of the metallic armour layers of the flexible pipe meet the required specifications by determining if the obtained temperature profile is within ranges set by the reference temperature profile.

17. The system according to claim 16, wherein the temperature sensor is an optical sensor.

18. The system according to claim 17, wherein the condition of the metallic armour layer(s) and the function of the optical sensor is determined on the basis of the output from the optical sensor.

19. The system according to claim 16, wherein the internal armour layer inside the internal pressure sheath is a metallic armour layer connected to the electric power source.

20. The system according to claim 16, wherein the at least one external armour layer is a metallic armour layer and connected to the electric power source.

21. The system according to claim 16, wherein the metallic armour layer is cyclically heated and cooled.

22. A system for testing an unbonded flexible pipe having a length and a longitudinal axis and comprising, from the inside and out, an internal armour layer, an internal pressure sheath, at least one external armour layer and an outer sheath and at least one temperature sensor connected to a monitoring system, and at least one of the armour layers is a metallic and electrically conductive armour layer, said system comprises:
the unbonded flexible pipe, and
an electric power source and the temperature sensor mounted in the unbonded
flexible pipe and connected to the monitoring system,
wherein the metallic armour layer is adapted for connection with the power source for heating the armour layer by sending an electric current through the metallic armour layer, and the monitoring system is adapted for processing measurements from the temperature sensor to obtain a temperature profile for the pipe, comparing the obtained temperature profile to a reference temperature profile, and determining if the flexible pipe meets the required specifications,
wherein the system is adapted to send electric power through the metallic armour layer during a first period, followed by a second period wherein the electric power is switched off, preferably the first period is in the range of about 10 minutes to about 10 hours, and preferably the second period is in the range of about 10 minutes to about 10 hours.

23. A method of testing an unbonded flexible pipe having a length and a longitudinal axis and comprising, from the inside and out, an internal armour layer, an internal pressure sheath, at least one external amour layer and an outer sheath, said pipe comprising at least one thermal sensor connected to a monitoring system, wherein the method comprises:
heating said flexible pipe by sending an electric power through the flexible pipe;
obtaining measurements of the temperature in the flexible pipe by using the thermal sensor;
processing the obtained measurements in the monitoring system to obtain a temperature profile for the pipe; and
comparing the obtained temperature profile to a reference temperature profile and determining if the flexible pipe meets required specifications,
wherein the electric power is transmitted to heat the pipe during a first period, followed by a second period wherein the electric power is switched off.

* * * * *